United States Patent
Egberg et al.

(10) Patent No.: US 8,748,723 B1
(45) Date of Patent: Jun. 10, 2014

(54) HUMIDITY CONTROL SYSTEM FOR WOOD PRODUCTS

(71) Applicant: Boveda, Inc., Wayzata, MN (US)

(72) Inventors: David C. Egberg, Bonita Springs, FL (US); Robert L. Esse, Monticello, MN (US)

(73) Assignee: Boveda, Inc., Wayzata, MN (US)

( * ) Notice: Subject to any disclaimer, the term of this patent is extended or adjusted under 35 U.S.C. 154(b) by 0 days.

(21) Appl. No.: 13/803,319

(22) Filed: Mar. 14, 2013

(51) Int. Cl.
  *G10G 7/00* (2006.01)
(52) U.S. Cl.
  CPC ..................... *G10G 7/00* (2013.01)
  USPC .............................. 84/453; 261/99
(58) Field of Classification Search
  CPC ......................................... G10G 7/00
  USPC ............................... 84/453; 261/99
  See application file for complete search history.

(56) References Cited

U.S. PATENT DOCUMENTS

| | | | | |
|---|---|---|---|---|
| 3,719,033 | A * | 3/1973 | Den Boer ..................... | 96/153 |
| 4,406,843 | A * | 9/1983 | Nakamura et al. ............ | 261/22 |
| 4,572,051 | A * | 2/1986 | Laskin ........................... | 84/453 |
| 4,649,793 | A * | 3/1987 | Blackshear et al. .......... | 84/453 |
| 5,936,178 | A * | 8/1999 | Saari ............................ | 84/453 |
| 6,244,432 | B1 * | 6/2001 | Saari et al. ................ | 206/213.1 |
| 6,620,992 | B1 * | 9/2003 | Kinnaird ...................... | 84/453 |
| 6,921,026 | B2 * | 7/2005 | Saari et al. .................. | 239/53 |
| 8,087,645 | B2 * | 1/2012 | Hepple ........................ | 261/99 |
| 8,220,782 | B2 * | 7/2012 | Hepple ........................ | 261/99 |

* cited by examiner

*Primary Examiner* — Robert W Horn
(74) *Attorney, Agent, or Firm* — C. G. Mersereau; Nikolai & Mersereau, P.A.

(57) ABSTRACT

A humidity control device for use in maintaining the desired humidity for wood musical instrument, art objects and museum artifacts, the device including a water vapor permeable pouch and a saturated aqueous solution having a suitable humidity control point for use with these objects.

25 Claims, 1 Drawing Sheet

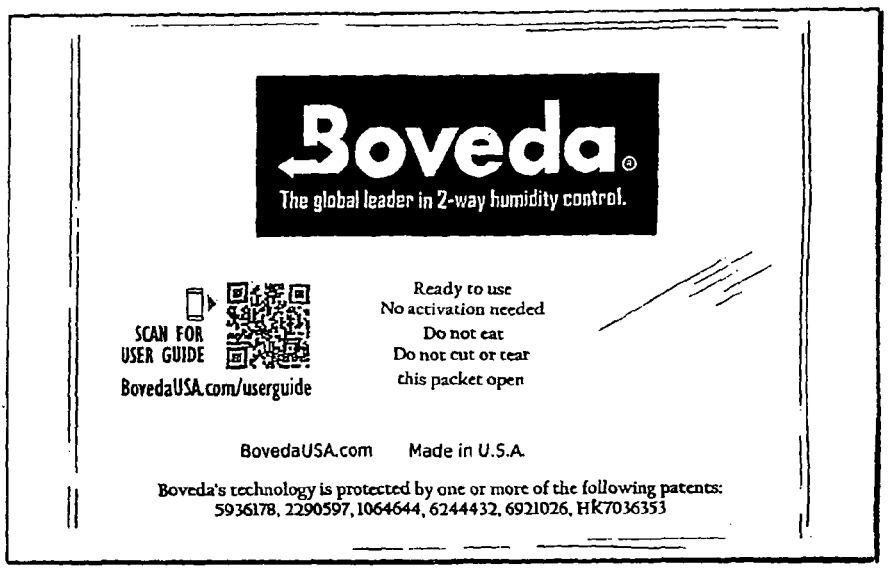
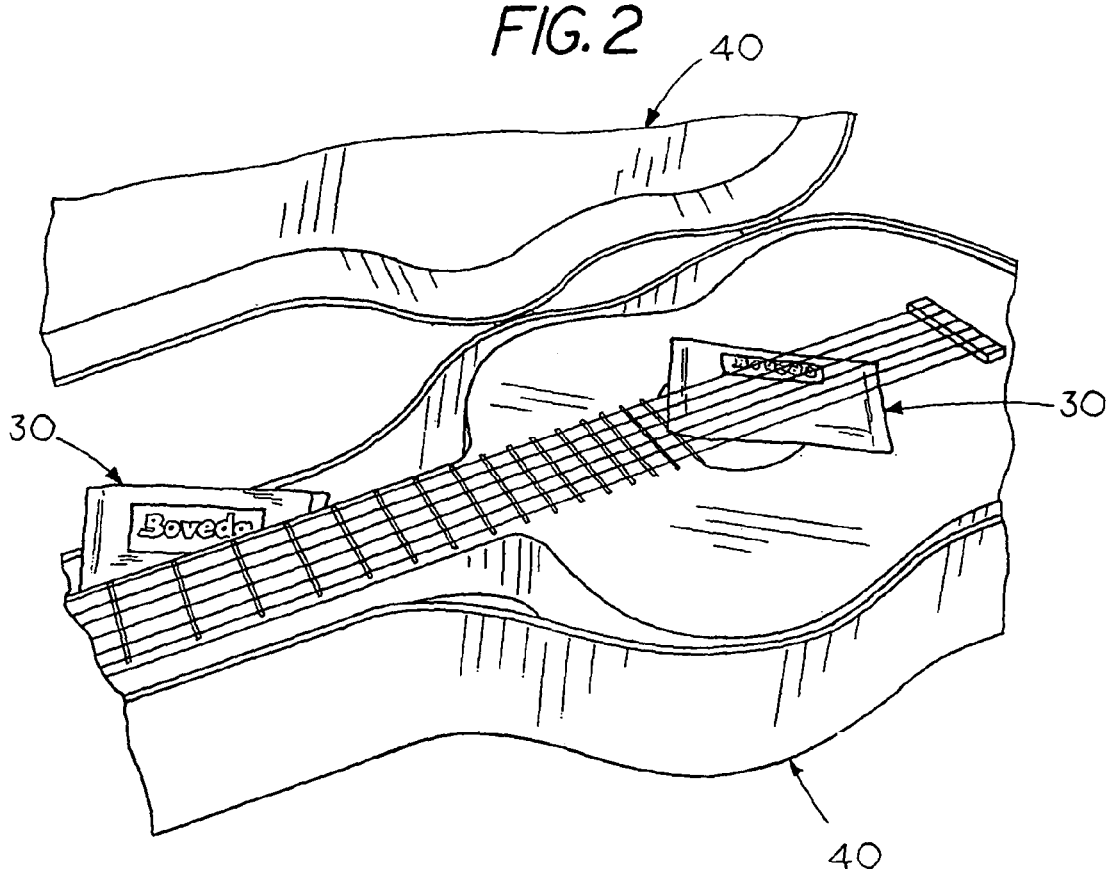

HUMIDITY CONTROL SYSTEM FOR WOOD PRODUCTS

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates generally to the preservation of wood containing objects and, in particular, to wood containing objects such as museum artifacts, and musical instruments by controlling the humidity of the storage environment for such items.

II. Related Art

Wood products stored in enclosures will absorb and release moisture as dictated by the temperature and storage environment humidity. Unfortunately, as moisture content changes, wood will shrink and expand in a manner that will often change the physical properties and appearance permanently and may damage a stored wood product. It is well known, for example, that in cold weather, particularly in polar latitudes, the indoor moisture content is often very low and low humidity levels cause wood products to shrink in a manner that may cause damage. Conversely, in high humidity environments such as tropical regions, the high humidity may well damage wood products due to moisture absorption and swelling. Because of concerns with environmental humidity, highly valued wood products such as art objects, musical instruments, and even expensive sports equipment are frequently sealed in a controlled humidity environment. The recommended relative humidity (RH) for the storage of wood products has been found to be between 40% and 60%.

As disclosed in U.S. Pat. No. 5,936,178, the relative humidity of closed environments can be stabilized by the use of humidity control systems comprised of moisture permeable pouches containing specific salt solutions. Also, certain non-ionic solution containing low molecular weight molecules such as ethylene glycol, propylene glycol, glycerin, urea, guanidine, ethanol amine, simple sugars, or sugar alcohols may be employed. The choice of the solute and the solute concentration in an aqueous solution determines the solution water activity ($a_w$). The water activity of a solution will equilibrate with the surrounding atmosphere until the relative humidity (RH) is equivalent to the water activity. Thus, the RH percentage will equal the $a_w \times 10^2$. For example, an aqueous solution of saturated sodium chloride with excess crystals, $a_w$ 0.75 will equilibrate with the moist air or dry air in a closed system until a relative humidity of 75 percent is achieved.

However, it has also been discovered that many of the solutions that are most effective in establishing and maintaining the optimal relative humidity range (40% to 60%) have undesirable properties such as chemical reactivity with packaging material, corrosiveness, undesirable gas formation, or limited moisture transfer capacity (MTC) (defined below). For example, a saturated solution of potassium carbonate with excess crystals will maintain a stable humidity in the desired 40% to 60% range, but the high pH of the material will degrade many packaging films. Another problem is the corrosive gas that is formed when nitrite salts are used to control the humidity.

The moisture transfer capacity (MTC) is defined as the amount of moisture transferred, into or out of a given control system, i.e. device, pouch, etc., over a defined relative humidity range. For example, an aqueous solution of calcium chloride, magnesium chloride, or glycerin may be used to control humidity between 40% and 60%, but the MTC is only about 15 to 20% of the package weight. Also, moisture control systems employing solid substrates such as silica gel or water absorbing organic polymers, e.g. acrylamide, can be formulated to a specific relative humidity; however, these systems are characterized by low moisture transfer capacity and are less useful for maintaining a controlled humidity environment. Clearly the moisture transfer capacity of a humidity control system is very important for maintaining the desired humidity over a range of environmental conditions. As the moisture transfer capacity of the device increases, there is an increased ability of the device to provide the necessary moisture to maintain the humidity required to protect a wood product of interest.

SUMMARY OF THE INVENTION

The present invention provides devices or containers in the form of packets or pouches containing material systems in the form of humidity control solutions for controlling the relative humidity at an optimal level for wood product and museum artifact preservation when such items are kept in a generally closed environment. This invention discloses preferred systems providing superior moisture transfer capacity for stabilizing the relative humidity generally within the critical range of 40% to 60% required for wood products. The disclosed formulas provide superior moisture transfer capacity in this range without undo corrosion, or package degradation. In a preferred form, the present invention employs a saturated aqueous solution of sodium formate mixed with acetate, lactate or citrate salts. These solutions may be contained in a variety of polymeric films that will allow the transfer of moisture vapor but not liquid solution and enable control the relative humidity between 40% and 60% in a sealed container such as a musical instrument case or a display cabinet.

Certain thickening agents may be added to these humidity control solutions in order to increase and control the viscosity. A high viscosity product will minimize undesirable solution leakage in the event of a package defect. Many potential thickening agents were disclosed in the above-cited U.S. Pat. No. 5,936,178. In the material of the present invention, the preferred thickening agents include hydroxyethylcellulose (Natrosol®), xanthan gum, alumina (Aeroxide®), and fumed silica (Aerosil®). These thickening agents have a high molecular weight and are added in low concentrations so that they exert only a minimal effect on the relative humidity control of the device yet greatly increase the viscosity of the solution.

In some embodiments, the humidity control solutions or systems in accordance with the invention are introduced into pouches formed from polymeric films that breathe in a manner such that they will transport moisture vapor but will contain the solution without leaking liquid. The water vapor transport, known as water vapor transmission rate (WVTR) is measured in terms of grams of water passed per 100 square inches of material per 24 hours under standard test conditions. It is a function of the type of film used and the thickness of the film. The total moisture transferred, of course, is also determined by the area of film exposed to a humidity control solution in a given application. It has been shown that a WVTR of about 10 grams water per 100 square inches over 24 hours provides good results for a device in accordance with the invention. Packaging film materials that may be employed include polyvinylchloride, fibrous polyethylene (TYVEV®), cellophane, polycarbonate, thin polyolefin, oriented polystyrene, polyfluorocarbon, or polyester such as the elastomer Hytrel® laminated onto a suitable substrate such as paper. The pouch may comprise polyamide nylon film, such as Capran®, styrene-butadiene copolymer such as K-Resin®, cellulose acetate, polyethylene terephthalate (Mylar®), ethylene vinyl acetate, or ethylene vinyl alcohol.

However, the relative humidity control device is not limited to a polymeric film pouch. Any container or material that will transport water vapor while retaining the liquid can provide a suitable container for the humidity control solutions of the invention.

An aspect of the invention is that the humidity control devices both add and remove water vapor in a storage container atmosphere to equilibrate the water activity of the humidity control solution of the control device with the surrounding atmosphere of the storage container. The particular choice of solute determines the $a_w$ or RH "set point" of a particular device or pouch. A plurality of pouches can be used in a given storage container. The devices may be of the same or different sizes or capacities and set points. While a WVTR of 10 gm water vapor per 100 $in^2$/24 hours provides good results, a general range from 1 to 25 gm water vapor in 24 hours may be used. Both the RH set point and the WVTR of a given device depend on the combination of the composition of the humidity control solution and the composition and thickness of the packaging film.

BRIEF DESCRIPTION OF THE DRAWINGS

In the Drawings:

FIG. 1 depicts a typical pouch for humidity control in accordance with the invention; and FIG. 2 depicts a plurality of the pouches of FIG. 1 placed in a guitar case with a guitar.

DETAILED DESCRIPTION

The following detailed description that describes one or more embodiments of the present invention in detail is offered by way of example and is not meant to limit the scope of the invention as other combinations and variations may occur to those skilled in the art that are well within the scope of the inventive concept.

The present invention comprises a humidity control device including a polymeric film pouch having walls sufficiently permeable to permit migration of water through the film in the form of water vapor and yet thick and impervious enough to prevent the escape of liquids. Certain preferred embodiments employ an aqueous humidity control solution including sodium formate, combined with potassium acetate or sodium lactate, and a thickening agent such as silica, hydroxyethylcellulose, alumina or xanthan gum. The solutions may contain excess solute, i.e. sodium formate, potassium acetate, or sodium lactate to increase the capacity of the device to remove water vapor from the surroundings.

The polymeric film pouch may be constructed of any size or shape necessary to hold the amount of solution necessary to stabilize the humidity of the environment of interest to be controlled. A typical device to maintain the humidity in a guitar case, for example, is a pillow like, water vapor permeable, polymeric pouch containing about 70 grams of control solution. Such a pouch is illustrated at 30 in FIG. 1. Larger pouches or multiple pouches may be employed to control the humidity of larger volumes such as glass or metal cases used to display or store art objects or museum artifacts.

The pouch of the present invention may be constructed of any polymeric material that contains the solution, but has a sufficient moisture vapor transmission rate. Materials such a polyethylene, polyvinylchloride, polystyrene, polyamides such as nylon, cellophane, ethylene vinyl acetate, and polyesters such as polyethylene terephthalate or Hytrel® have been employed successfully. A preferred packaging material contains a thermoplastic polyester elastomer sold under the trademark Hytrel®.

The preferred range of water vapor transmission rate for the pouch material is one that transmits moisture from about 1 percent to about 40 percent by weight of the initial total package contents over a 24-hour period in an atmosphere of less than 10% relative humidity and wherein the pouch absorbs moisture from about 1 percent to about 40 percent by weight of total initial package contents over a 24-hour period in an atmosphere greater than 85 percent relative humidity. Most preferably, the pouch material is one that transmits and absorbs water vapor in an amount from about 1% to about 50% by weight of the total initial package contents over a 24-hour period in the respective atmosphere of 10% relative humidity and 85% relative humidity.

The preferred water vapor permeable pouch materials include pouches comprising polymeric materials such as polyester, Hytrel®, polyvinylchloride, polymeric fluorocarbon, nylon, poly lactate, polyethylene vinyl alcohol, polyethylene vinyl acetate, polystyrene, polyethylene, Surlyn®, polypropylene, polyethylene terephthalate, combination polymers or similar materials that transmit water vapor, but not liquid water. Any material that meets the basic criteria might be used. Any receptacle that transmits water vapor as desired and provides a barrier to liquids can be used. In addition, the moisture control system, sealed pouch may be contained in a second (outer) water vapor permeable pouch, bag or other container in order to provide back-up protection if the primary pouch should leak.

The solutions disclosed in this invention may contain from 15% to 55% water depending on the humidity of the environment to be controlled. The sodium formate, sodium lactate and potassium acetate are used to obtain the optimal humidity control, and certain formulations may contain an excess of these components, generally as crystals. Although thickening agents are not required or instrumental in controlling humidity, the humidity control solutions may be thickened to improve processing and minimize potential leaks. Although different thickeners can potentially be employed, hydrophelia fumed silica in the form of Aerosil® 200 (Eronik) and brine tolerant xanthan gum (Danisco® SM) are preferred. The xanthan is used at levels ranging from 0.2% to 0.7% and the Aerosil is used at about 2.5% to achieve the desired viscosity which is in the range of about 500 to about 7000 centipoise.

With respect to humidity control compositions, an additional drawback to many involves off-gassing, or the evolution of trace gases such as hydrogen sulfide, sulfur oxides, volatile acids or nitrogen oxides which will, over time, corrode components such as metal or fabric in an object to be protected by a humidity control device. A standard test in the industry is referred to as the Oddy test which exposes lead, copper and silver to the humidity control system at 60° C. for 28 days. Any deleterious off-gassing will corrode one or more of these metals and render the corresponding humidity control device unacceptable for many applications. The humidity control devices of the present invention do not have this drawback as they are able to pass the Oddy test and are quite benign to the typical environment of use.

Thus, preferred materials for the moisture control system include an aqueous solution containing salts selected from sodium formate and potassium formate combined with one or more additional components selected from sodium lactate, potassium lactate, sodium citrate, potassium citrate, sodium acetate and potassium acetate.

The pH of the solution may be adjusted using common acids or bases such as, but not limited to, citric acid, lactic acid, formic acid, phosphoric acid, phosphate salts, sodium hydroxide, or potassium hydroxide. A preferred pH range is from about 6.5 to about 9.5.

Preferably, but not necessarily, the humidity control solution is thickened with a viscosity control agent selected from, but not limited to, such substances as silica, alumina, chemically modified cellulose and xanthan gum. Activated carbon may also be added to the humidity control solution.

Operation

In use, the humidity control devices of the present invention are placed in sealed cases or other similar place containing an object to be protected by controlled humidity. For example, as depicted in FIG. 2, one or more pouches 30 may be placed in a guitar or violin case 40 with an instrument 50. Likewise, one or more pouches may be placed in a sealed cabinet containing art work or museum artifacts. Theoretically, if the pouch were sized correctly and the cabinet or case had a perfect seal, the controlled humidity would be maintained indefinitely. However, actual environments are less than ideal and cases and cabinets tend to leak and may be opened from time to time. Accordingly, a given pouch will gain water or lose water in such a fashion as to project the valuable object until the pouch has gained or lost water exceeding its moisture transfer capacity. This limit can be determined easily by measuring either the relative humidity in the case cabinet, or the weight change in the pouch.

A preferred method to contain the humidity control pouch in an environment to be controlled is to place it inside a bag constructed of Gortex® or similar material that will contain any potential solution leak, but will readily enable transfer of water vapor.

EXAMPLES

Example 1

In one preferred embodiment of the present invention, a saturated aqueous solution of sodium formate containing potassium acetate was prepared by adding 470 grams of sodium formate to 355 grams of water and 170 grams of a potassium acetate solution containing 50% potassium acetate and 50% water (weight). Xanthan gum Danisco SM (3 grams) was dispersed into the mixture. This mixture was heated to 160° F. (71.1° C.) and then cooled to 120° F. (48.9° C.). This solution was filled into a pouch comprised of Hytrel® film (DuPont) ($1.5 \times 10^{-3}$ inches thick) on a paper substrate. The pH was found to be 8.9 and the relative humidity 53% (water activity 0.53). When placed in a dry atmosphere (10% RH) in a guitar case, this device emitted 32% of the solution weight as moisture before it reached the 40% RH limit. When placed in a humid atmosphere (85% RH), this solution absorbed 15% of the pouch content weight before reaching the higher 60% RH (0.60 water activity) limit. These are highly satisfactory results and a pouch containing 70 grams of this solution was able to maintain the desired humidity for several months in a guitar case, containing a guitar, when tested over a variety of high and low humidity conditions. This humidity control system also passed the Oddy off-gassing performance test.

Example 1A

A saturated aqueous solution of sodium formate containing potassium acetate was prepared by adding 470 grams of sodium formate to 355 grams of water and 170 grams of potassium acetate solution (50% water) as in Example 1. The mixture was heated to 100° F. (37.8° C.) and 35 grams of Aerosil® 200 hydrophilic fumed silica (Eronik) was added and thoroughly mixed. The pH was found to be 7.2 and the humidity 52% (water activity 0.52). The water emitting and absorbing characteristics of this formula were similar to that of Example 1 when exposed to equivalent environmental conditions. This humidity control system also passed the Oddy off-gassing performance test.

Example 1B

A saturated aqueous solution of sodium formate containing potassium acetate was prepared exactly as described in Example 1A except 60 grams of alumina (Aeroxide® Alu 130) fumed aluminum oxide (Eronik) was added in place of the Aerosil®. The pH was found to be 8.7 and the water activity 0.52. This solution performed essentially equivalent to that of Example 1A. This humidity control system passed the Oddy off-gassing performance test.

Example 2

A saturated aqueous solution of sodium formate containing sodium lactate was prepared by adding 470 grams of sodium formate, 125 grams of 60% sodium lactate solution (40% water) (weight), and 5 grams of xanthan gum to 400 grams of water. The mixture was heated to 160° F. (71.1° C.) during continuous mixing. This solution pH was 8.2 and the water activity 0.54. This solution had a moisture transfer capacity of 36% of the initial solution weight before it reached the a lower limit of 0.43 water activity and 12% solution weight was gained in a high humidity environment until the upper limit of 60% RH (0.60 water activity) was reached. When placed in a guitar case, three 70-gram pouches maintain the relative humidity within the case for over three months. This humidity control system also passed the Oddy off-gassing performance test.

Example 3

A saturated aqueous solution of sodium formate containing potassium citrate was prepared by adding 430 grams of sodium formate and 142 grams of tripotassium citrate mono hydrate to 430 grams water. The initial water activity was 0.53 and the pH 8.3. In a low humidity environment (10% RH), this solution was shown to lose 35% water by weight of the initial solution before reaching a water activity of 0.40.

Example 4

Formula to Control High Humidity Environment

A saturated aqueous solution of sodium formate containing sodium lactate was prepared by adding 400 grams of sodium formate to 300 grams of 60% sodium lactate (40% water) (weight). The mixture contained a substantial excess of sodium formate crystals. The water activity of the solution was 0.44, the pH was 7.8. When this solution was exposed to an atmosphere greater than 85% RH, this solution gained 58% water by weight of the solution before reaching the high limit relative humidity of 60% (0.60 water activity). This humidity control system also passed the Oddy off-gassing performance test.

Example 5

Formula to Control High Humidity Environment

A saturated aqueous solution of sodium formate containing potassium acetate was prepared by adding 150 grams of sodium formate to 290 grams of a 50% aqueous solution of potassium acetate. The water activity was shown to be 0.38 and the pH 9.07. This solution containing excess crystals gained 45% of the initial mixture weight as water before reaching a water activity of 0.60. This humidity control system also passed the Oddy off-gassing performance test.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A humidity control device for use in a closed environment for maintaining a relative humidity in the closed environment in the general range of 40% to 60%, the device comprising:
   (a) a pouch formed of a thin-walled polymeric material permeable to water vapor but not to liquid solutions;
   (b) a humidity control solution comprising saturated aqueous salt solution containing an amount of alkali metal formate selected from sodium formate and potassium formate and combinations thereof sealed in said pouch wherein said salt solution contains from about 30% to 90% salt; and
   (c) wherein the water vapor permeability of the pouch is such that the moisture transfer capacity of the pouch transmits at least from about 1% to about 50% by weight of the initial pouch contents in a 24-hour period when exposed to an atmosphere of less than 10% relative humidity and absorbs at least from about 1% to about 50% by weight of the initial pouch content when exposed to an atmosphere having greater than 85% relative humidity.

2. A humidity control device as in claim 1 wherein the humidity control solution further comprises an aqueous solution containing one or more salts selected from the group consisting of sodium lactate, potassium lactate, sodium citrate, potassium citrate, sodium acetate and potassium acetate.

3. A humidity control device as in claim 2 wherein said alkali metal formate salt is sodium formate.

4. A humidity control device as in claim 1 wherein said humidity control solution is thickened by an amount of one or more compatible viscosity control agents.

5. A humidity control device as in claim 3 wherein said humidity control solution is thickened by an amount of one or more compatible viscosity control agents.

6. A humidity control device as in claim 4 wherein said one or more viscosity control agents are selected from the group consisting of silica, alumina, chemically modified cellulose and xanthan gum.

7. A humidity control device as in claim 5 wherein said one or more viscosity control agents are selected from the group consisting of silica, alumina, chemically modified cellulose and xanthan gum.

8. A humidity control device as in claim 1 wherein the device passes the Oddy off-gassing test.

9. A humidity control device as in claim 5 wherein the device passes the Oddy off-gassing test.

10. A humidity control device as in claim 1 wherein said humidity control solution contains an amount of activated carbon.

11. A humidity control device as in claim 1 wherein said humidity control solution comprises an aqueous solution of sodium formate containing an amount of potassium acetate.

12. A humidity control device as in claim 11 wherein said solution of sodium formate is saturated.

13. A humidity control device as in claim 12 further comprises an amount of xanthan gum.

14. A humidity control device as in claim 12 further comprises an amount of alumina.

15. A humidity control device as in claim 1 wherein said humidity control solution comprises a saturated aqueous solution of sodium formate containing an amount of sodium lactate.

16. A humidity control device as in claim 15 wherein said humidity control solution contains an excess amount of sodium formate crystals.

17. A humidity control device as in claim 1 wherein said humidity control solution comprises a saturated aqueous solution of sodium formate containing an amount of potassium acetate.

18. A humidity control device as in claim 1 wherein the pH of the humidity control solution is in the range of from about 6.5 to about 9.5.

19. A humidity control device as in claim 18 wherein the pH of the humidity control solution is adjusted by adding an amount of an acid or base selected from the group consisting of citric acid, lactic acid, formic acid, phosphoric acid, phosphate salts, sodium hydroxide, or potassium hydroxide.

20. A humidity control device as in claim 1 wherein said polymeric material of said pouch is selected from the group consisting of polyesters, polyamides, polyvinylchloride polymeric fluorocarbons, poly lactate, polyethylene vinyl chloride, polyolefin's, polystyrene, polyethylene terephthalate, styrene-butadiene copolymer, and combinations thereof.

21. A humidity control device as in claim 1 further comprising vapor-permeable outer pouch for containing said pouch as a further protection against leaks.

22. A humidity control device as in claim 1 further comprising a bag for containing said pouch.

23. A humidity control device as in claim 20 wherein said polymeric material of said pouch comprises a polyester.

24. A method of controlling relative humidity in a closed environment comprising introducing one or more humidity control devices of claim 1 into the closed environment and monitoring the relative humidity in that environment at timed intervals.

25. A method as in claim 24 including monitoring the weight of said one or more humidity control devices.

* * * * *